Figure 1:
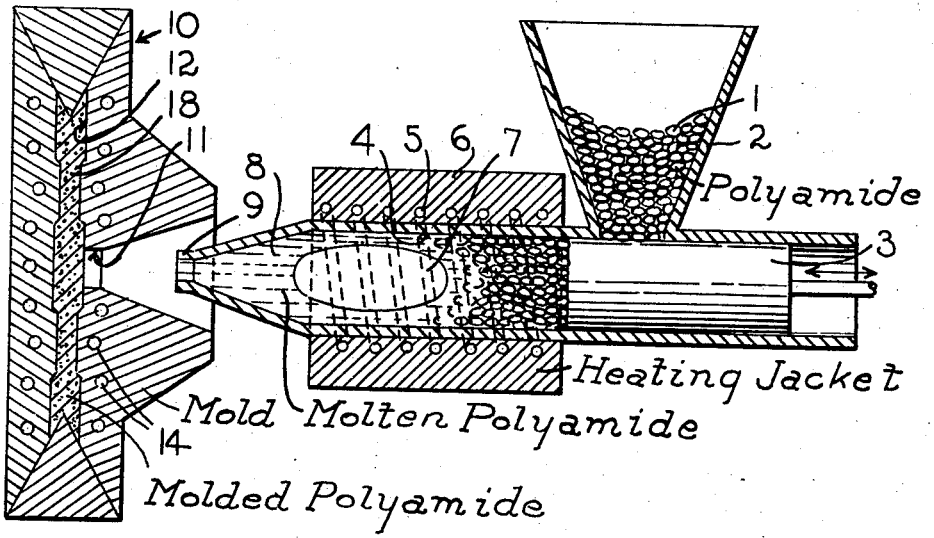

March 27, 1945.  A. F. SMITH  2,372,630
MANUFACTURE OF IMPROVED MOLDED POLYAMIDE ARTICLES
Filed May 26, 1941

INVENTOR.
Albert F. Smith
BY R. F. Miller.
ATTORNEY

Patented Mar. 27, 1945

2,372,630

UNITED STATES PATENT OFFICE 2,372,630

MANUFACTURE OF IMPROVED MOLDED POLYAMIDE ARTICLES

Albert Faris Smith, Wilmington, Del., assignor to E. I. du Pont de Nemours & Company, Wilmington, Del., a corporation of Delaware Application May 26, 1941, Serial No. 395,268

10 Claims. (Cl. 18—47.5)

This invention relates to the art of molding and more particularly to the manufacture of improved molded products from high molecular weight synthetic linear polyamides known in the trade as nylon.

The synthetic polymeric materials used in the practice of this invention are the synthetic linear polyamides of the general type described in U. S. patents, 2,071,250, 2,071,253 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above or as otherwise identified hereinafter can be obtained, for example, by self-polymerization of monoamino-monocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the interpolymers as well as in the simple polyamides, the amide group NHC:X in which X is oxygen or sulfur is an integral part of the main chain of atoms in the polymer, and the average number of carbon atoms separating the amide groups is at least two. On hydrolysis with hydrochloric acid the amino acid polymers yield the amino acid hydrochloride, and the diamine-dibasic acid polymers yield the diamine hydrochloride and the dibasic carboxylic acid.

The polyamides described above are known to yield on injection molding articles of unusual value for many purposes because of their high melting point, unusual toughness, light color, and translucency. The stiffness and hardness of these materials are greater than that of many commercial plastics but are still not so great as is desired for certain applications where the greatest stiffness and hardness possible are necessary to provide maximum rigidity or maximum resistance to scratching or marring.

This invention has as an object a new process for obtaining improved molded polyamide products. A further object is the production of formed polymide articles of increased stiffness and hardness. Other objects will appear hereinafter.

These objects are accomplished in the preferred embodiment of the invention by a process which comprises the steps of melting the polyamide while in a substantially dry state as more particularly defined hereinafter, introducing the molten polymer into the mold, rapidly cooling the molten polymer in the mold, and then finally heating the formed article obtained at temperatures above 120° C. but below the melting point of the polymer until the stiffness and hardness are substantially increased over that possessed by the article before said final heating.

While improvements have been obtained with moisture contents as high as 0.9%, in the best embodiment of the invention the polyamide is dried to a moisture content less than 0.40% by weight of the polymer. To obtain such dry or substantially anhydrous polyamide a positive drying step is necessary since the polyamide absorbs considerably more than this amount of water through contact with the atmosphere at normal humidity. Thus in an atmosphere of 50% relative humidity, at 25° C., the polyamide polyhexamethylene adipamide will contain 2.6% of moisture. The use of dry polyamide results in a higher impact strength than the final product would have otherwise, insures good surface and uniform toughness in the finished molding, and reduces dripping of the molten polymer from the nozzle during the injection molding process.

In the drawing

Figure 2:
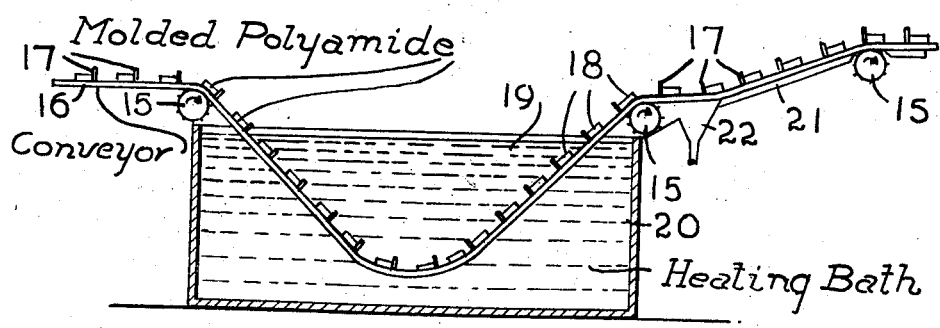

Fig. 1 is a diagrammatic elevational view in section of a form of apparatus from which can be obtained the rapidly chilled molded articles which are subsequently heat treated in the manner described hereinafter, and Fig. 2 is a diagrammatic view in elevation of apparatus suitable for carrying out the heat-treatment of the polyamide molded articles obtained from the apparatus shown in Fig. 1.

Finely divided polyamide 1 after being dried is fed into the hopper 2. The piston 3, when moved back or to the right, permits the pieces of polymer to enter the chamber 4 which is electrically heated by the coil 5 and which is insulated by the jacket 6. When the piston is moved forward to the position shown in the drawing the polyamide is forced past a stationary torpedo 7 which spreads the polymer in a layer readily melted by the heated walls of the chamber. The molten polymer at 8 is forced through the nozzle 9 which is engaged with a demountable mold 10, one section of which is provided with an opening 11 which receives the nozzle and which leads to the mold cavity 12. On further movement of the piston the mold cavity is filled with the molten polyamide which through contact with the chilled mold surfaces quickly solidifies to form the molding 18. The mold is chilled by cold water forced through the conduits 14 in the mold. It is to be understood that the particular molding apparatus in itself forms no part of the present invention. In practice the moldings are made with great rapidity by appropriate mechanism associated with the above described apparatus.

In forming the molded article there is used as cold mold or die surfaces as are readily obtainable by means of water circulating through internal passages in the die plate, or by other means for rapidly chilling the mold contents. By this means the polymer is solidified within a time of not more than 10 seconds. This rapid chilling is accomplished without contacting the polyamide with water. Rapid chilling also aids in conferring maximum toughness and impact strength to the final article. The article thus formed is then heated in an inert liquid, such as mineral oil, above 120° C. and from 20° C. to 45° C. below the melting point of the polyamide until the stiffness is increased by at least 20%. This procedure also results in a substantial increase in hardness. Depending on the specific polyamide used the stiffness can be increased by the present process 100% or more, and the hardness 30% or more as measured on the Rockwell L scale (i. e., with a 60 kg. weight and one-fourth inch diameter ball). The increase in hardness and stiffness is accompanied by a decrease in impact strength but the sacrifice is not more than 50%. The time of heating is in general not less than two minutes, the duration of the final heating required for optimum results depending on the temperature and thickness of the molded article. When operating at temperatures above 150° C. the time required to secure the desired effect is not more than two minutes longer than is necessary to heat the molded article throughout to the temperature used. At 150-200° C. the overall period of heating will generally be from two to ten minutes. The heating should be discontinued before the impact strength is decreased by more than 50%.

Apparatus suitable for heating the moldings in accordance with the requirements given above is shown in Fig. 2. The moldings 18 are carried through an oil bath 20 in the container 19 on an endless conveyor 16 of woven wire construction which is driven by the sprockets 15. Projections 17 are provided to prevent slipping of the moldings. An inclined plane 21 is provided from which the oil after draining into a funnel 22 can be reheated and returned to the bath. The speed of the conveyor is regulated to permit immersion of the moldings for the desired time. The bath is heated by suitable thermostatic equipment not shown and is preferably agitated by mechanical means to maintain a uniform temperature throughout.

This invention includes also the application of the final heating step outlined above to polyamide articles molded or die cast by methods other than that comprising the steps previously given which are prior to the final heating step. The hardness and stiffness of molded polyamide articles are materially improved by heating in inert liquid under the conditions mentioned, although the improvement obtained is not to the high degree made possible by the use of this step in conjunction with the initial steps previously given.

The polyamides used in the practice of this invention are preferably those in which the polymerization has been continued until the intrinsic viscosity, which is an indication of molecular weight, is at least 0.7 as defined in U. S. Patent 2,130,948, and until the absolute viscosity of the molten polymer at 285° C. is at least 100 poises.

The following examples, in which all parts are by weight, further illustrate my invention.

*Example I*

Polyhexamethylene sebacamide having an intrinsic viscosity of 0.85 and a viscosity of 490 poises at 285° C. is ground to pass a 20 mesh screen and is dried at 70° C. under 20 mm. pressure for 24 hours or until the moisture content of the polymer is less than 0.40%. The dried polymer is then injection molded at 15° C. above the minimum temperature at which operation is possible. Operation under these conditions insures good surface on the moldings, high impact strength, and greatest resistance to degradation by ultraviolet light. After the molding has been conditioned at 25° C. and 50% relative humidity, it had a bending modulus of $0.16 \times 10^6$ lbs./sq. in., a hardness number of 75 as determined by the Rockwell method using the L scale, and a notch impact strength of 1.64 ft. lbs./in. (Charpy).

The article thus obtained is then immersed for ten minutes in mineral oil heated to 185-190° C., is allowed to cool, is cleansed with benzene, and after conditioning at 25° C. and 50% relative humidity, has a bending modulus of $0.33 \times 10^6$ lbs./sq. in and a hardness number of 98. The impact strength is now 1.2 ft. lbs./in. The structure of the polymer is dense and uniform.

*Example II*

Repetition of the experiment given in Example I with dried polyhexamethylene sebacamide having a viscosity of 1750 poises at 285° C. using various lengths of time for the final heating at 185-190° C. in oil gives the following results: After five minutes the stiffness (bending modulus in pounds per square inch) increases from 0.20 to 0.30 or 50%, and the hardness (Rockwell L scale) from 78 to 83 or 6%. Up to a time of three hours no substantial change in stiffness takes place but the hardness increases a maximum of 11% at 30 minutes. Similarly, carrying out the experiment with the same time of five minutes throughout but with varying temperatures shows that the maximum increase in stiffness occurs with temperatures of about 180 to 190° C. and that the lower of these temperatures is preferable since it has no adverse effect on impact strength.

*Example III*

Eighty-five parts of polyhexamethylene sebacamide of intrinsic viscosity 0.9, ground and dried as described in Example I, is well mixed with 15 parts of powdered p-tertiary-butyl phenol-formaldehyde resin which is a non-heat-hardening phenolic resin. This composition molds at a lower temperature than does the unmodified polyhexamethylene sebacamide and is preferably molded at as low a temperature (about 250° C.) as is found to be operable. The molded articles are immersed for five minutes in oil heated to 185–190° C. as described in Example I. This increases the bending modulus from $0.24 \times 10^6$ lbs./sq. in. to $0.37 \times 10^6$ lbs./sq. in., and increases the hardness number from 85 to 96. The polymer is uniformly dense. The use of a phenol-formaldehyde resin in this composition reduces the moisture sensitvity of the polymer and reduces the cost of the material.

Example IV

Polyhexamethylene adipamide having a viscosity of 16,000 poises at 285° C. is dried to a moisture content of 0.40% or less and is injection molded at about 300° C. with rapid cooling of the molded articles. The molded articles are heated under high boiling mineral oil at 240° C. for five minutes. After being cooled, washed, and conditioned at 25° C. and 50% relative humidity, the articles are found to have a bending modulus of $0.38 \times 10^6$ lbs./sq. in. which is 80% greater than that of the original molded articles. The impact strength of the molded articles is decreased about 8% by the heat treatment. The heat-treated molded articles are of uniformly dense structure, i. e. free of bubbles.

The optimum temperature of the final heat treatment for this polyamide is from 230 to 240° C.

It is believed that rapid chilling in the molding step causes the polyamide to solidify, at least in part, in a non-crystalline form which is tough, ductile, and relatively soft, and that the subsequent heating step converts the polyamide from the amorphous to the crystalline form thereby improving its hardness and stiffness without materially affecting its toughness.

In general, polymers having a viscosity of 1500 poises or more at 285° C. yield the best moldings with regard to good surface and uniform toughness, and these desirable properties are insured if the polymer is dried to a moisture content of 0.20% or less by heating the ground polymer for about six hours at 160–170° C. The use of polymer that has been well stirred during about the last hour of its preparation likewise tends to provide greater uniformity, and extraction of the ground material with hot water, followed by careful drying, secures a beneficial result. Stabilization of the polymer by such acids as p-phenylaminophenoxyacetic acid, which protect the polymer against heat degradation, permits molding of the polymer at higher temperatures than are otherwise possible without adversely affecting toughness and impact strength. They also protect the molded articles against embrittlement during exposure to ultraviolet light.

Plasticizers can be added to the polyamides or the polyamide/phenol-formaldehyde resin mixtures in order to increase toughness, decrease moisture sensitivity, and decrease cost of the molding composition.

Examples of other polyamides useful in the practice of this invention are described in the above mentioned patents. As already indicated the straight polyamides show a greater response to the heat treatment than do interpolyamides or interpolymers derived from mixtures of polyamide-forming reactants with other polymer-forming reactants. It should be understood that the polyamides can be prepared from amide-forming derivatives of the dibasic carboxylic acid, diamine, and amino acid reactants previously mentioned. Amide-forming derivatives of the amino acids include the esters, anhydrides, amides, lactams, acid halides, N-formyl derivatives, carbamates, and nitriles in the presence of water. Amide-forming derivatives of the dibasic carboxylic acids comprise the mono- and di-esters, the anhydrides, the mono- and diamides, acid halides, and the following compounds in the presence of water: Nitriles, cyanocarboxylic acids, cyanoamides, and cyclic imides. Amide-forming derivatives of the diamines include the carbamates, N-formyl derivatives and the N,N'-diformyl derivatives.

Molded products obtained by methods which do not include the procedure described herein are inferior in hardness and stiffness to the molded articles obtained in accordance with the present method.

The present process because of the stiffer products obtained is particularly useful for the production of moldings in very thin sections, that is from 0.004 to 0.040 inch. These articles as previously obtained show a greater impact strength and translucency but lower stiffness than polyamide molded in thicker sections.

Variations from the molding procedure given in the examples can be used to impart characteristics desirable for certain purposes. Lower melting polyamides can be molded about strands or filaments of higher melting polyamides placed in the mold before injection of the lower melting material. Reinforcing and stiffening are secured in this way, and the stiffness and hardness of the composite construction is further increased by the present process.

Oriented nylon in finely divided form, such as obtained by cutting a ribbon which has been cold drawn, can be molded below its usual melting point if the individual particles contain plasticizer. At least a portion of the material, however, will melt, and the improvement obtained by the practice of this invention increases in proportion to the amount of material melted in the forming step. It is also possible to compression mold the finely divided polyamide just below its melting point by using high pressure, namely, at least 10,000 pounds per square inch and thus obtain bubble free articles. Again surface fusion must take place.

The molding process described herein is applicable to polyamide containing fillers, resins, plasticizers, pigments, dyes and other modifying agents. The articles can be colored by inclusion of pigments or coloring agents in the molding powder, or they can be colored by dyeing after molding. The lightfastness of dyes applied after molding is increased if phenolic plasticizers, such as octyl phenol, are included in the molding composition.

This process can be advantageously employed in the production of improved nylon reeds for woodwind instruments, for example, where maximum stiffness may be desired. Similarly, the process may be employed in connection with slide fasteners ("zippers") prepared from nylon where maximum surface hardness and resistance to wear are desirable. Other applications for the products of this invention are bobbins, heads for spools, clubs, tooth brush handles, dentures, teeth fillings, golf club heads and inserts for faces of golf club heads, ferrules for golf clubs, knives, etc.; handles, especially those to be sterilized in boiling water such as those on surgical instruments, lenses, especially lenses for black-out lamps, knobs, and in general for applications at temperatures above those tolerated by present commercial plastics and for the replacement of zinc and aluminum die castings as in automobile horns, automotive trim, lamp housings, etc.

As many apparently widely different embodiments of this invention may be made without departing from the spirit and scope thereof, it is to be understood that I do not limit myself to the specific embodiments thereof except as defined in the appended claims.

I claim:

1. A process for manufacturing a shaped article from a high molecular weight synthetic linear polyamide which comprises disposing a fused high molecular weight synthetic linear polyamine in a mold, solidifying the polyamide by cooling it in the mold within 10 seconds, and then heating the article thus formed under essentially anhydrous conditions at a temperature above 120° C. but below the melting point of the polyamide until the stiffness and hardness of said article is substantially increased.

2. A process for manufacturing a shaped article from a high molecular weight synthetic linear polyamide which comprises introducing into a mold the polyamide heated to fusion from essentially anhydrous condition, solidifying the polyamide by cooling it in the mold within 10 seconds, and then heating the article thus formed under essentially anhydrous conditions at a temperature above 120° C. but below the melting point of the polyamide until the stiffness and hardness of said formed article is substantially increased.

3. A process for manufacturing a shaped article from a high molecular weight synthetic linear polyamide which comprises melting the polyamide while in essentially anhydrous condition, molding the molten polyamide to shape in a mold, solidifying the polyamide by cooling it in the mold within 10 seconds, and then heating the article thus formed under essentially anhydrous conditions at a temperature above 120° C. but below the melting point of the polyamide until the stiffness and hardness of said formed article is substantially increased.

4. A process for manufacturing a shaped article from a high molecular weight synthetic linear polyamide which comprises dehydrating the polyamide to a moisture content of not more than 0.4% by weight of the polyamide, melting the dehydrated polyamide and introducing it into a mold, solidifying the polyamide by cooling it in the mold within 10 seconds, removing the resultant article from the mold and then heating the article under essentially anhydrous conditions at a temperature above 120° C. and from 20° C. to 45° C. below the melting point of the polyamide until the stiffness and hardness of said formed article is substantially increased.

5. In the production of molded high molecular weight synthetic linear polyamide articles of improved properties, the step which comprises heating a molded article of said polyamide in mineral oil at a temperature above 120° C. and from 20° C. to 45° C. below the melting point of the polyamide until the stiffness and hardness of the article is substantially increased.

6. In the production of molded high molecular weight synthetic linear polyamide articles of improved properties, the step which comprises heating a molded article of polyhexamethylene sebacamide for a period of from 2 to 10 minutes in mineral oil at a temperature of 180° C. to 190° C.

7. In the production of molded high molecular weight synthetic linear polyamide articles of improved properties, the step which comprises heating a molded article of polyhexamethylene adipamide for a period of from 2 to 10 minutes in mineral oil at a temperature of 230° C. to 240° C.

8. The process set forth in claim 3 in which said polyamide is polyhexamethylene sebacamide and in which the heating of the article formed in the mold is at a temperature of 180° C. to 190° C.

9. The process set forth in claim 3 in which said polyamide is polyhexamethylene adipamide and in which the heating of the article formed in the mold is at a temperature of 230° C. to 240° C.

10. In the production of molded high molecular weight linear polyamide articles of improved properties, the step which comprises heating a molded article of said polyamide in mineral oil at a temperature above 120° C. but below the melting point of the polyamide until the stiffness and hardness of the article is substantially increased.

ALBERT FARIS SMITH.

CERTIFICATE OF CORRECTION.

Patent No. 2,372,630. March 27, 1945.

ALBERT FARIS SMITH.

It is hereby certified that error appears in the printed specification of the above numbered patent requiring correction as follows: Page 3, first column, line 15, for "sensitvity" read --sensitivity--; and second column, line 36, for "iln" read --in--; page 4, first column, line 21-22, claim 1, for "polyamine" read --polyamide--; and that the said Letters Patent should be read with this correction therein that the same may conform to the record of the case in the Patent Office.

Signed and sealed this 7th day of August, A. D. 1945.

Leslie Frazer (Seal)          Acting Commissioner of Patents.